Patented Sept. 22, 1953

2,653,106

UNITED STATES PATENT OFFICE 2,653,106

MANUFACTURE OF ALGINATES

Cyril Wilfred Bonniksen, Oxford, England

No Drawing. Application February 19, 1951, Serial No. 211,796. In Great Britain April 27, 1949

8 Claims. (Cl. 99—131)

The present invention relates to the manufacture of alginates.

The alginates are derived from seaweed, but since the parent substance, alginic acid, is unstable, sodium alginate is the substance most easily obtainable commercially.

The alginates can be grouped into those which can be dissolved in water and those which are, to all intents and purposes, insoluble.

The former include the alginates of the alkali metals and ammonium and magnesium, whilst most of the others are insoluble.

Alginates are extensively used in the preparation of foods, for example, for the thickening of ice cream and custards and the setting of jams, jellies and so forth. In consequence those alginates which are edible are of particular importance. Of these, the most commonly used are sodium alginate from the soluble group and calcium alginate from the insoluble group. Since, however, calcium alginate by itself is insoluble in aqueous media, this substance can be used in food preparations in very small quantities only. Never-the-less it is rendered soluble in the presence of an excess of sodium alginate and it can therefore be used as a solubility-controlling agent for the sodium alginate which usually forms the bulk of the alginate ingredient.

Although sodium alginate is one of the more readily soluble of the alginates, it commonly takes several hours to dissolve, say, 10% by weight of powdered sodium alginate in water, and one of the objects of this invention is to improve the solubility rates of the soluble alginates in aqueous media.

One of the reasons why sodium alginate powder is slow in dissolving is that, immediately the particles are thrown into water, they tend to coagulate and form themselves into masses of cohering jelly, which action thereafter slows up the rate at which water can reach the interior of the alginate masses. It is therefore another object of the invention to improve the dispersibility of alginate powders in aqueous media.

According to the invention a process of preparing water-soluble alginate powders having improved solubility rates comprises the step of taking particles of powder of water-soluble alginate and protecting them with a screening substance which remains in situ in the powder and, when the protected particles are placed in an aqueous medium, screens the soluble alginate initially from the action of the medium until it has finally dispersed as discrete particles in the medium.

According to a further feature of the invention there is provided a process comprising the steps of mixing the water-soluble alginate with a solution of a salt, the base of which salt gives an insoluble alginate and the solvent of which solution is volatile and does not dissolve the water-soluble alginate, and then evaporating off the solvent to leave a powder each particle of which consists of a core of soluble alginate coated with water-insoluble alginate the salt being employed in such proportion that the product contains sufficient of the water soluble alginate to bring the insoluble alginate into solution when the powder is mixed with water.

For example, the soluble alginate powder may be mixed with an alcoholic solution of a calcium salt, preferably calcium chloride. By this treatment it would appear that the surface of each particle is converted to calcium alginate. The alcohol itself has no effect on the soluble alginate powder, being in this respect, unlike water, which swells the powder.

The treated powder is subsequently warmed to a temperature of 50° C. or so and is stirred continuously until the alcohol vaporises or evaporates off.

It will then be found that this powder can be mixed with water without clotting or coagulating the particles and complete solution can be obtained in times varying from say one minute to 15 minutes according to the intensity of the calcium treatment given. The treatment has no effect on the particle size of the alginate—and the preferred particle size for use is 40 mesh.

Such a process can be applied to improve the solubility of any of the water-soluble alginates. In the place of the calcium salt there may be used the salt of any metal whose alginate by itself would be insoluble in water but which is capable of being dissolved in the presence of an excess of the soluble alginate.

The solvent must, of course, be reasonably volatile and must be such that, whilst taking up the coating salt, does not attack the soluble alginate. Suitable solvents may be found among the lower alcohols and the lower ketones.

In this process it is important that the amount of added salt such as calcium chloride should be such that when the whole of it reacts with the alginate only that proportion of the alginate is converted to the water-insoluble compound that is capable of being dissolved in the presence of the remainder of the soluble alginate. Normally this means that not more than about 25% of the alginate is converted to the water-insoluble compound such as calcium alginate.

According to another feature of the invention, there is provided a process comprising the steps of mixing the soluble alginate particles with highly concentrated solution of a salt the base of which forms a soluble alginate and then drying it. Such a salt might, for instance, be sodium citrate. It is believed that the coating of sodium citrate thus formed on the particles prevents too rapid dissolution of the treated alginate in water, when the alginate is immersed therein, by screening the particles with a surrounding zone of solution of the salt, which being initially very concentrated prevents dissolution of the alginates. It may be supposed that when the concentration of the salt solution has become dispersed in the liquid, the alginate can then dissolve, but by that time there has been opportunity for the alginate particles to become dispersed as discrete particles separated from one another in the liquid.

Indeed it is believed that by all the forms of the process of the present invention, dissolution of the soluble alginate is temporarily inhibited for a time sufficient to allow the particles to become separated from one another in the aqueous medium and that by the time the water is free to attack the soluble alginate the latter is spread throughout the water in relatively small discrete particles which are therefore quickly dissolved.

The following are given as examples of specific methods of carrying the process according to this invention into effect:

*Example I*

25 pounds of 44 mesh sodium alginate of approximately 20% moisture content was placed in a mixer and treated with 600 ml. of an alcoholic solution of calcium chloride containing 10% of the salt, and stirred continuously until it could be seen that the solution has been distributed throughout the powder. This took about one minute and was judged by the eye, as the powder darkened in colour. The alcohol was then driven off by heating to 50° C. and the resulting powder dissolved readily in water, with suitable stirring, in approximately three minutes. The calcium alginate was completely dissolved in the sodium alginate solution.

*Example II*

To obtain a readily soluble product in which approximately 20% of the sodium alginate has been replaced by calcium, 25 lbs. of 44 mesh sodium alginate was placed in a mixer and treated with 1 lb. of calcium chloride dissolved in 2¾ lbs. of 90% alcohol. After stirring for about 5 minutes the mix, which remained in the form of powder, was dried at about 50° C. The powder obtained dispersed readily in water and formed a translucent solution within two to three minutes.

*Example III*

A rapidly dispersing and dissolving powder was prepared from sodium alginate powder by the following procedure:

To 100 grams of sodium alginate powder were added 50 cubic centimetres of a saturated solution of sodium citrate in water. It was found that the solution was completely absorbed by the powder and that the individual particles did not adhere to one another. The powder was dried at a low temperature, about 50° C. This powder proved soluble in water more quickly than pure sodium alginate powder and without the same difficulty in avoiding clotting.

Water solutions of other salts, such as sodium phosphate, may be similarly used in suitable proportions.

The sodium alginate treated in any of the ways described above can be used for example as a stabiliser in ice cream production.

I claim:

1. A process of preparing a readily soluble alginate powder comprising the steps of mixing a water-soluble alginate in dry powder form with a solution of a salt, the base of which salt gives an insoluble alginate and the solvent of which solution is volatile and does not dissolve the water-soluble alginate, and then evaporating off the solvent to leave a powder, each particle of which consists of a core of dry soluble alginate coated with water-insoluble alginate, the salt being employed in such proportion that the product contains sufficient of the water soluble alginate to bring the insoluble alginate into solution when the powder is mixed with water.

2. A process as claimed in claim 1 wherein the salt is calcium chloride.

3. A process as claimed in claim 1 wherein the solvent is a lower alcohol.

4. A process as claimed in claim 1 wherein the solvent is a lower ketone.

5. A process of preparing a water soluble alginate powder which comprises treating about 25 parts of powdered sodium alginate with 1½ parts of a 10% alcoholic solution of calcium chloride and stirring until the powder darkens in color and evaporating the alcohol.

6. A process for preparing a water soluble alginate powder in which approximately 20% of the sodium alginate has been replaced by calcium alginate, which comprises taking 25 parts of sodium alginate and treating with one part of calcium chloride, dissolving in alcohol, stirring, and drying the powder.

7. A process of preparing a readily soluble alginate powder consisting in treating the particles of a dry powder of a water soluble alginate with a substance selected from the group consisting of a calcium chloride solution and a sodium citrate solution.

8. A process for preparing a water soluble alginate powder comprising the steps of mixing a dry, water soluble alginate powder with a highly concentrated solution of sodium citrate and then drying the mixture.

CYRIL WILFRED BONNIKSEN.

References Cited in the file of this patent

UNITED STATES PATENTS

| Number | Name | Date |
| --- | --- | --- |
| 2,011,594 | Seltzer | Aug. 20, 1935 |
| 2,403,547 | Peschardt | July 9, 1946 |
| 2,420,308 | Gates | May 13, 1947 |